(12) United States Patent
Yamamoto

(10) Patent No.: US 7,638,232 B2
(45) Date of Patent: Dec. 29, 2009

(54) STRUCTURE FOR MOUNTING BACKUP BATTERY

(75) Inventor: Hideki Yamamoto, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 1029 days.

(21) Appl. No.: 10/768,154

(22) Filed: Feb. 2, 2004

(65) Prior Publication Data

US 2004/0209157 A1 Oct. 21, 2004

(30) Foreign Application Priority Data

Feb. 4, 2003 (JP) .............................. 2003-027348

(51) Int. Cl.
*H01M 2/10* (2006.01)
(52) U.S. Cl. ...................... 429/100; 429/123
(58) Field of Classification Search ................. 429/100, 429/123, 163, 176, 177, 186, 175, 187
See application file for complete search history.

(56) References Cited

U.S. PATENT DOCUMENTS 3,293,078 A * 12/1966 Frye .......................... 429/119

5,995,375 A 11/1999 Miyazawa et al.

FOREIGN PATENT DOCUMENTS

| JP | U 61-180453 | | 11/1986 |
| JP | U 1-71865 | | 5/1989 |
| JP | HP 4-105590 | * | 4/1992 |
| JP | U 4-105590 | | 9/1992 |
| JP | U 6-88049 | | 12/1994 |
| JP | 07-213346 | * | 8/1995 |
| JP | A 8-250085 | | 9/1996 |
| JP | A 9-27685 | | 1/1997 |
| JP | A 9-63555 | | 3/1997 |
| JP | A 9-116276 | | 5/1997 |
| JP | A 9-193502 | | 7/1997 |
| JP | A 10-312781 | | 11/1998 |
| JP | A 11-16552 | | 1/1999 |
| JP | A 11-89012 | | 3/1999 |
| JP | A 2000-208116 | | 7/2000 |

* cited by examiner

*Primary Examiner*—Patrick Ryan
*Assistant Examiner*—Monique Wills
(74) *Attorney, Agent, or Firm*—Oliff & Berridge, PLC

(57) ABSTRACT

A structure includes a storage portion and a cover. The storage portion is provided in a body of an apparatus and includes a recess, which opens to an outside of the apparatus and stores the backup battery therein. The cover is attached to the body of the apparatus to cover the backup battery put in the recess. A partition wall separates the storage portion from an inside of the apparatus.

11 Claims, 9 Drawing Sheets

STRUCTURE FOR MOUNTING BACKUP BATTERY

BACKGROUND OF THE INVENTION

1. Field of the Invention

The present invention relates to a structure for mounting a backup battery in an apparatus.

2. Description of the Related Art

A backup battery is heretofore used in an apparatus such as a VCR or a facsimile machine using a timepiece or a memory. In such an apparatus, electric power consumption of the backup battery is low throughout the duration of use of the apparatus because electric power of a main power supply is used when the apparatus is operating. Therefore, electric power of the backup battery is generally set so that the backup battery need not be exchanged for a new one in the duration of use of the apparatus.

The backup battery, however, has to be separated from the apparatus and collected at the time of discard of the apparatus, for environmental concerns. It is therefore desired that there should be provided a structure in which the backup battery mounted in the apparatus can be removed by a user himself or herself for the sake of disposal.

For example, JP-A-Hei.11-16552 has disclosed a structure in which a flat backup battery is held in an apparatus. JP-A-Hei.11-16552 is intended to improve inconvenience in collection of the backup battery heretofore fixed to a circuit board. The backup battery is first electrically fixed to a substantially circularly shaped battery board by soldering. The battery board is then positioned and held in a battery holder by a plurality of lock pieces. A mount hole is provided in a back surface of the apparatus so that the battery holder can be fitted into the mount hole. A socket electrically connected to the battery is provided in the battery board. Lead wires having plugs at their tips are attached to the circuit board incorporated in the apparatus and using electric power of the backup battery, so that the lead wires can be drawn out through the mount hole.

Accordingly, at the time of production of the apparatus, the backup battery can be attached to the apparatus as follows. While the plugs of the lead wires are drawn out through the mount hole and connected to the socket of the battery board, the backup battery is held together with the battery board in the battery holder and fitted into the mount hole of the apparatus.

On the other hand, the apparatus user can remove the backup battery as follows. First, the battery holder is removed from the apparatus. Because the battery holder is only held in the apparatus by the elastic lock pieces, the user can remove the battery holder easily without use of a jig or the like by gripping a knob piece protruding from the apparatus. Then, the user removes the battery board from the battery holder and disconnects the socket of the battery board from the plugs of the lead wires drawn out through the mount hole. In this manner, the user can dispose of the backup battery together with the battery board.

SUMMARY OF THE INVENTION

In the structure described in JP-A-Hei.11-16552, the mount hole provided in the apparatus body is however a relatively large hole in which the battery holder of the backup battery can be fitted. Moreover, because the structure is formed so that the battery holder can be removed easily without use of any jig, there is a possibility that something may collide with the knob piece of the battery holder to remove the battery holder unnecessarily.

For this reason, there is fear that a finger or an alien matter may be put into the apparatus body through the mount hole by mistake when the user makes a battery removing operation or when the battery holder is removed in the aforementioned manner. Accordingly, the structure for mounting the backup battery needs consideration of safety as well as good removability to the user.

Moreover, because the backup battery is held toward the inside of the apparatus from the mount hole provided in the apparatus, there is a possibility that trouble may be caused by contact with other parts if the backup battery drops out to the inside of the apparatus. Therefore, in JP-A-Hei.11-16552, the battery holder is shaped like a complex structure having a large number of lock pieces or the backup battery is soldered and fixed to the battery board in order to hold the backup battery surely. Accordingly, a large number of parts are required for mounting the backup battery. Moreover, the parts are complex in shape. In addition, there is a problem that the operation for mounting the backup battery is complex.

An object of the invention is to provide a structure for mounting a backup battery, in which the a forementioned problems are solved.

To solve the technical problems, an embodiment of the invention provides a structure for mounting a backup battery, including a storage portion and a cover. The storage portion is provided in a body of an apparatus and includes a recess, which opens to an outside of the apparatus and stores the backup battery therein. The cover is attached to the body of the apparatus to cover the backup battery put in the recess, According to this configuration, because the recess included in the storage portion of the apparatus opens toward the outside of the apparatus though the backup battery is put in the recess, the backup battery can be prevented from dropping out to the inside of the apparatus. Moreover, because the backup battery is covered with the cover, the backup battery can be prevented from dropping out of the apparatus. Accordingly, safety can be improved. In addition, because the storage portion is only provided as a cavity, the structure of the storage portion can be made very simple. Accordingly, production cost can be reduced.

DETAILED DESCRIPTION OF THE PREFERRED EMBODIMENT

An embodiment of the invention will be described below with reference to the drawings.

In each embodiment of the invention, the invention is applied to a multifunctional device as an apparatus having a backup battery. The multifunctional device includes a printer function, a copying function, a scanner function, a facsimile function, a telephone function, etc.

Figure 1:
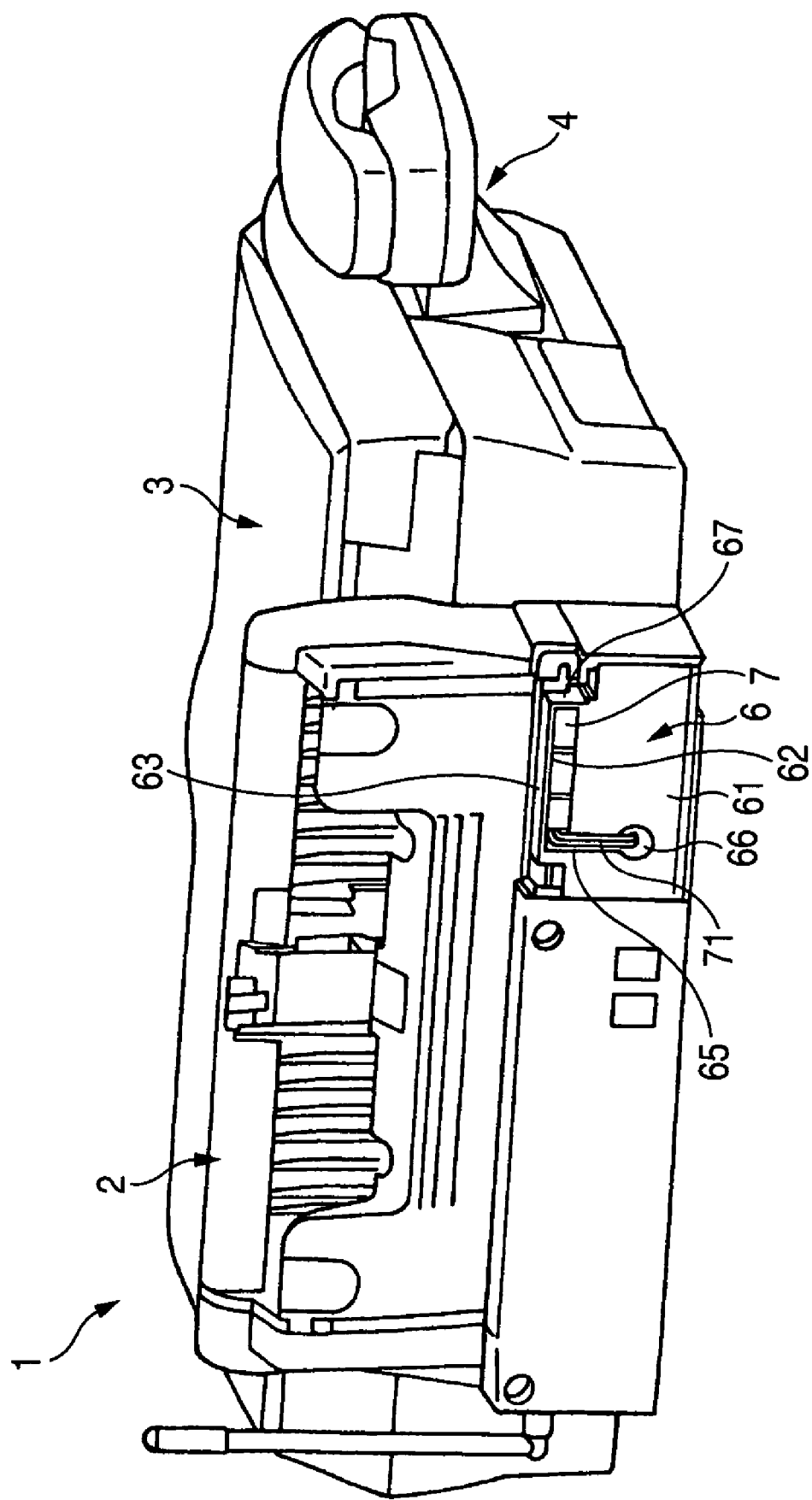
FIG. 1 is a view of an external appearance of an apparatus having a structure for mounting a backup battery according to an embodiment of the invention in the case where the external appearance is viewed from the back of the apparatus in a state in which a cover is removed from the apparatus.

As shown in FIG. 1, a paper supply unit 2 is provided on the upside of a rear portion (on the front side in FIG. 1) of the multifunctional device 1. A document reading unit 3 used for both the copying function and the facsimile function is provided on the upside of a front portion (on the rear side in FIG. 1) of the paper supply unit 2. An ink jet printer 4 for achieving the printer function is provided on the whole of the downside of the document reading unit 3. A paper outlet table 5 (see FIG. 6) for discharging printed sheets of paper is provided in front of the ink jet printer 4.

In this embodiment, a storage portion 6 is provided in a lower left corner of a rear portion (i.e., in a front lower right corner in FIG. 1) of the multifunctional device 1 so that the backup battery 7 is stored in the storage portion 6. The storage portion 6 is separated from the inside of the multifunctional device 1 by a partition wall 61, so that the inside of the multifunction device 1 can be prevented from being exposed even in the case where a cover 68 which will be described later is removed as shown in FIG. 1.

A recess 62 opened to the outside of the multifunctional device 1 is provided on the upside in the storage portion 6 so that the backup battery 7 can be put into the recess 62. In this embodiment, the recess 62 is opened to the back because the storage portion 6 is provided in the rear portion of the multifunctional device 1. However, in another embodiment in which the storage portion 6 is provided in another portion than the rear portion, a recess opened to the outside may be formed in accordance with the location of the recess.

Figure 3:
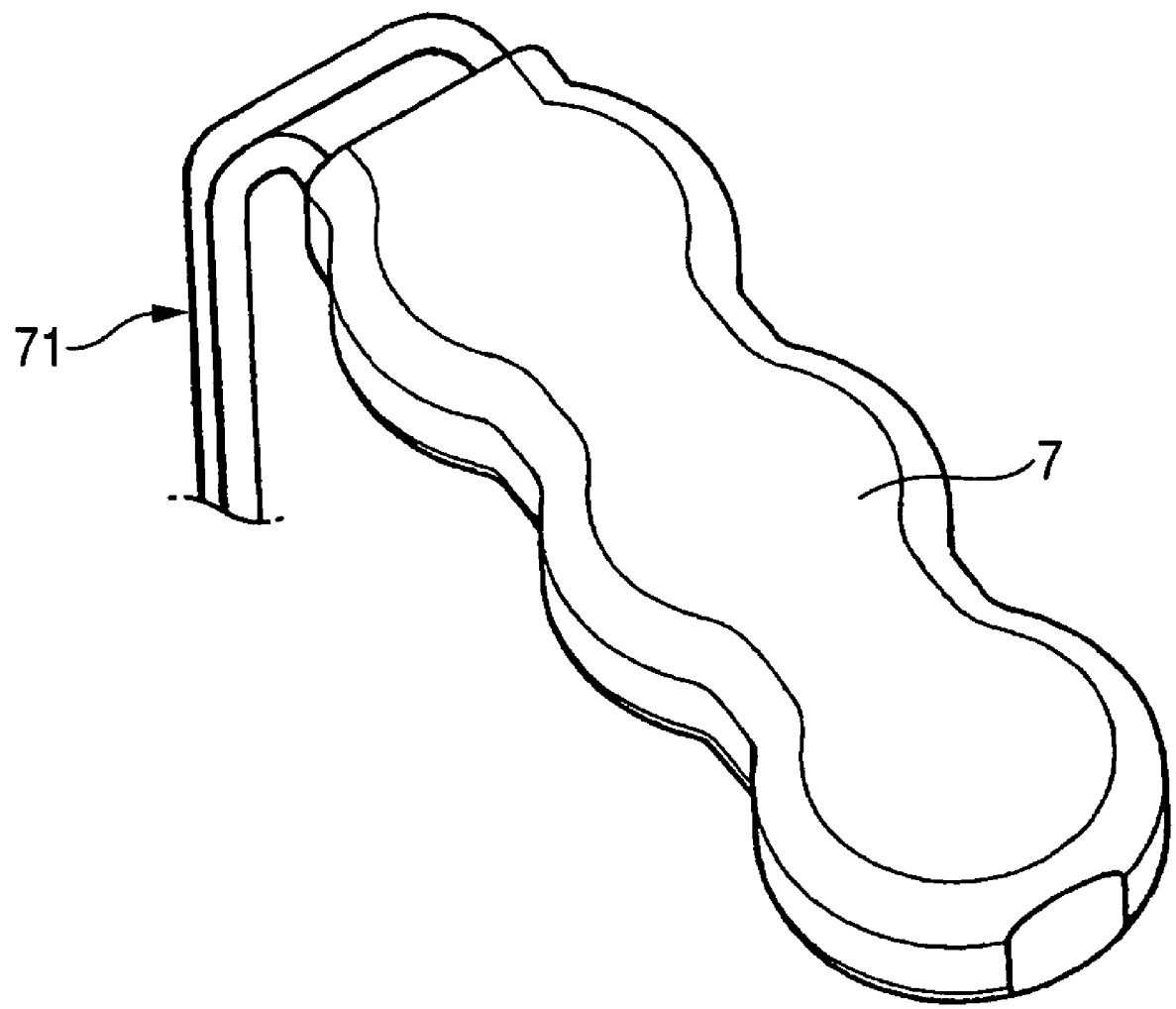
FIG. 3 is a view of an external appearance of the backup battery.

Because the backup battery 7 has a flat and long shape as shown in FIG. 3, the recess 62 is formed to have such a shape that the backup battery 7 can be put into the opening of the recess 62 in the condition that flat surfaces of the backup battery 7 are provided as top and bottom surfaces while the lengthwise direction of the backup battery 7 is provided as a lateral direction. That is, the recess 62 is formed to have such a shape that the depth of the opening is shorter than the width of the opening. The recess 62 has no means for fixing or retaining the backup battery 7. The backup battery 7 can be put into the recess 62 only in such a manner that the backup battery 7 is inserted into the recess 62.

The backup battery 7 shown in FIG. 3 is formed as a structure in which three flat batteries arranged side by side and connected in parallel with one an other are integrated in to one body. Lead wires 71 are drawn out from positive and negative electrodes respectively to one end side of the backup battery 7 in the lengthwise direction. A connection terminal 72 which will be described later is attached to ends of the lead wires 71 (see FIG. 7). A nickel-hydrogen battery or the like is used as the backup battery 7. It is noted that the nickel-hydrogen battery is a secondary battery.

Figure 5:
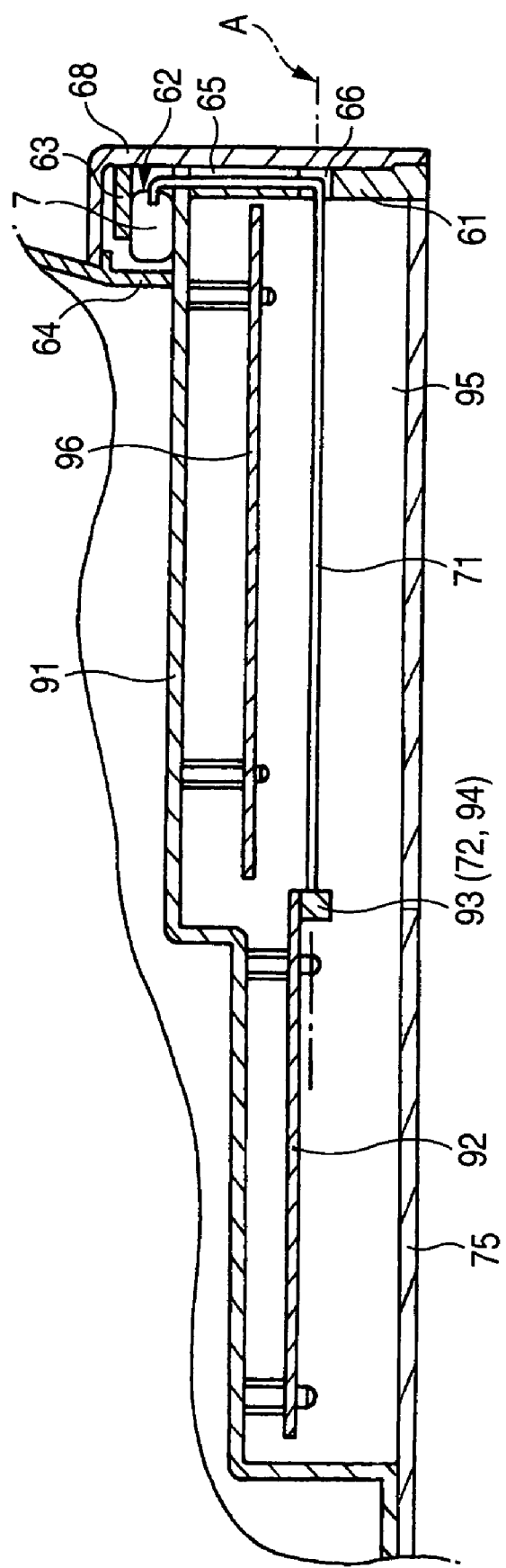
FIG. 5 is a partly sectional view taken along the line V-V in FIG. 4.

As shown in FIG. 5, in this embodiment, the recess 62 includes a rear edge portion of a flat plate 91, an upper plate 63, a second partition wall 64, and side walls 67. The flat plate 91 is provided horizontally in the inside of the multifunctional device 1 for mounting various parts. The upper plate 63 is provided on the rear side of the flat plate 91 and on the upside of a portion corresponding to the storage portion 6 (see FIGS. 1 and 2) so as to be parallel with the flat plate 91. The second partition wall 64 is provided vertically at a position at a predetermined inward distance from the rear edge portion of the flat plate 91. The side walls 67 (see FIGS. 1 and 2) are formed in such a manner that side end portions of the upper plate 63 are bent vertically. That is, part of a flat surface of the flat plate 91 forms a bottom surface of the recess 62, the upper plate 63 forms a top surface of the recess 62, the second partition wall 64 forms a back surface of the recess 62, and the side walls 67 provided as bent parts of the side end portions of the upper plate 63 form side surfaces of the recess 62.

As described above, the recess 62 can be shaped like a simple cavity. If the backup battery 7 can be put in the recess 62, the recess 62 need not be provided as an integrated member. Accordingly, existing members of the multifunctional device 1 can be used for forming the recess 62 because it is unnecessary to use any member exclusively for the recess 62. Incidentally, the configuration of the recess 62 shown in FIG. 5 is only shown as an example. It is a matter of course that the recess 62 is not limited to this configuration.

The partition wall 61 is formed as a vertical surface that abuts on the lower portion of the rear end portion of the flat plate 91. A groove portion 65 extending downward from one end of the recess 62 as a start point is formed in the partition wall 61. An insertion hole 66 piercing the partition wall 61 in the direction of the thickness of the partition wall 61 is provided at an end of the groove portion 65. The groove portion 65 is provided for guiding the lead wires 71 of the backup battery 7 to the insertion hole 66 while storing the lead wires 71 partially. The though-hole 66 is formed to have a size enough to insert the connection terminal 72 attached to ends of the lead wires 71. Specifically, the diameter of the insertion hole 66 is selected to be in a range of from 1.5 times to 2 times as large as the length of the connection terminal 72 so that the connection terminal 72 is not caught in the insertion hole 66 when the connection terminal 72 is inserted into the insertion hole 66. Accordingly, the size of the insertion hole 66 is suppressed to be enough to prevent a finger from being inserted into the insertion hole 66, so that a finger can be prevented from being inserted into the inside of the partition wall 61 by mistake.

Figure 2:
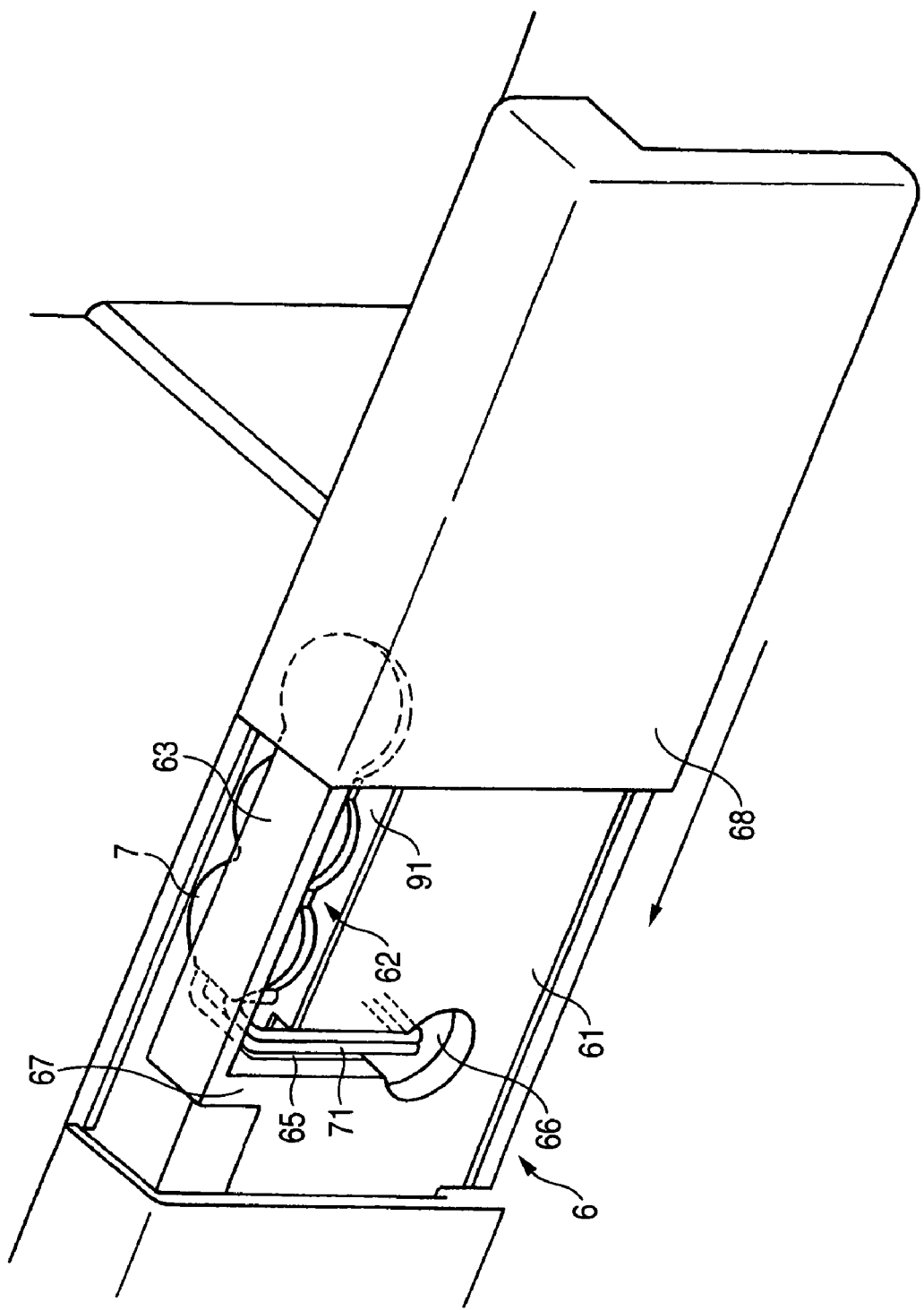
FIG. 2 is a perspective view of the structure for mounting the backup battery.
Figure 4:
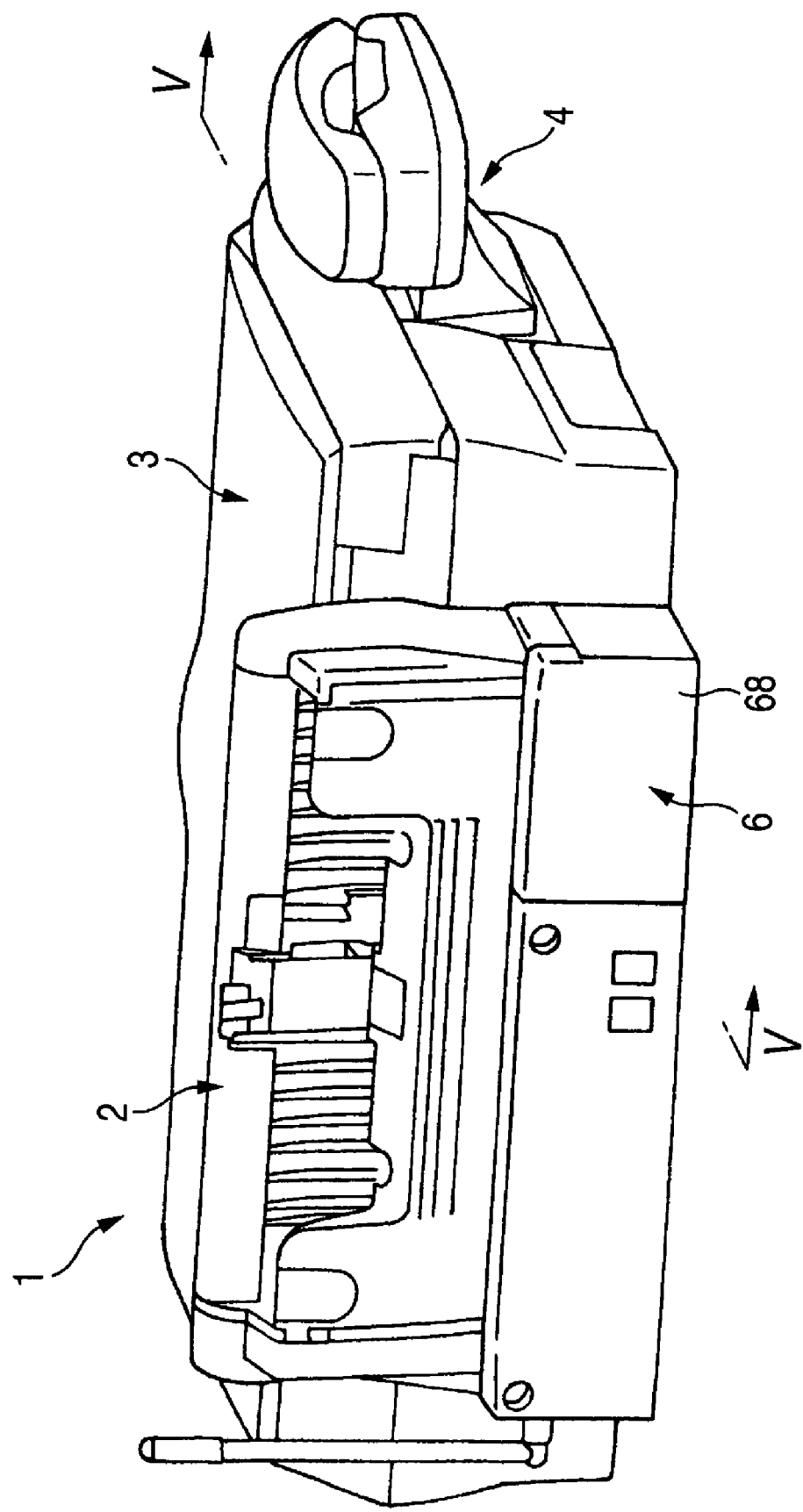
FIG. 4 is a view of an external appearance of the apparatus having the structure for mounting the backup battery in the case where the external appearance is viewed from the back of the apparatus in a state in which the cover is attached to the apparatus.

A slide type cover 68 is detachably attached to the storage portion 6 so that the cover 68 can be opened/closed easily without necessity of any jig or the like. As shown in FIG. 5, the cover 68 is located at a slight distance from the opening of the recess 62 so that the backup battery 7 can be pressed against the recess 62 when the cover 68 is closed. Accordingly, the cover 68 serves as means for improving stain resistance and safety and also as means for preventing the backup battery 7 from dropping out. As shown in FIGS. 2 and 4, there is no protrusion etc. provided on an outer surface of the cover 68 so that the cover 68 can be prevented from being opened unnecessarily even in the case where something comes into contact with the cover 68.

On the other hand, a plurality of circuit boards and parts are provided in the inside of the multifunctional device 1. They are fixed to the flat plate 91 or the like as shown in FIG. 5. The bottom of the multifunctional device 1 is covered with a bottom plate 75. The backup battery 7 supplies electrical power to one 92 of the circuit boards. The circuit board 92 has a connection portion 93 for electrically connecting the circuit board 92 and the connection terminal 72 of the backup battery 7 to each other. Male-female fitting type connectors are used in the connection portion 93. That is, a male connector is used in a connection terminal 94 on the circuit board 92 side while a female connector is used in the connection terminal 72 on the backup battery 7 side.

Figure 6:
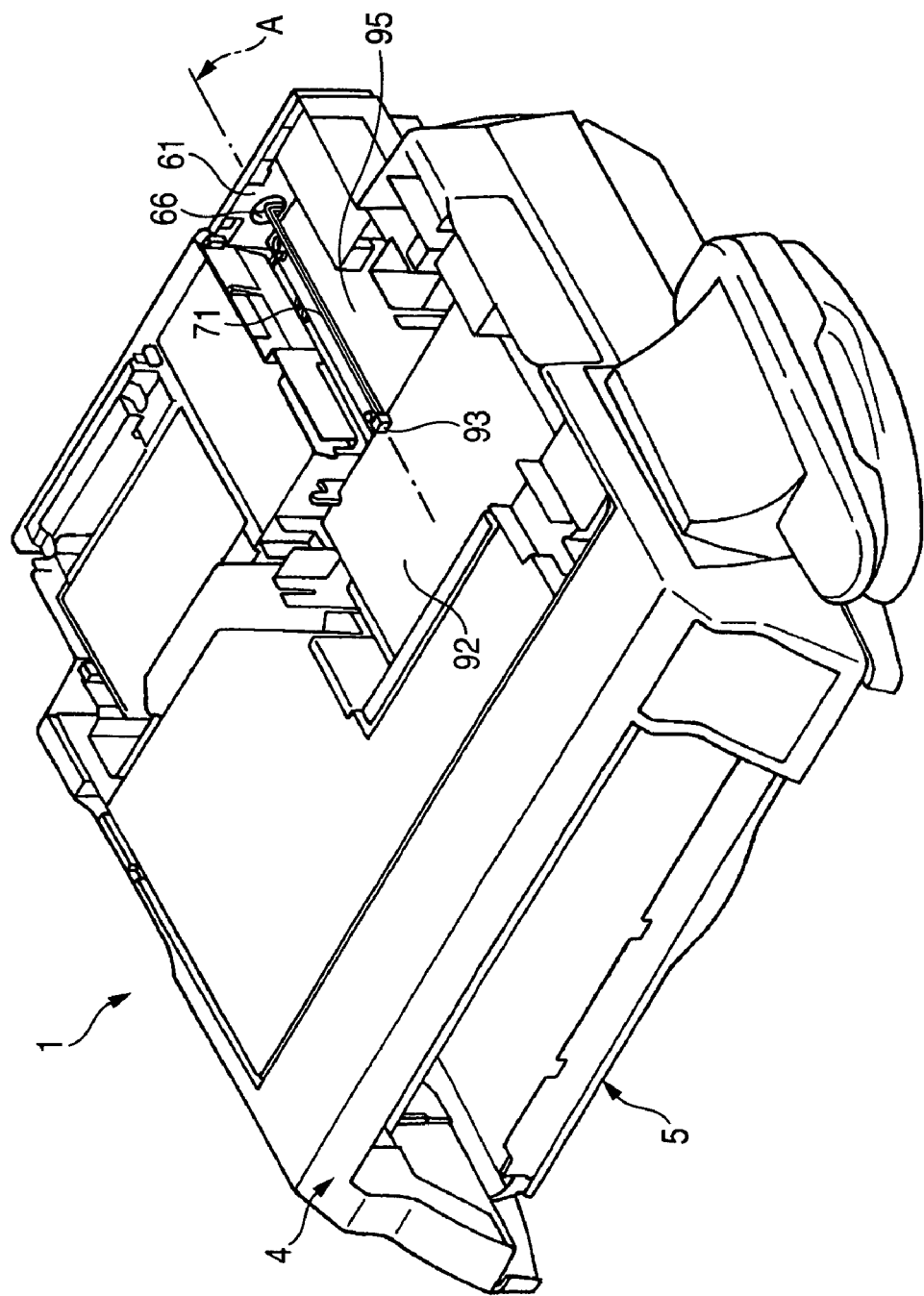
FIG. 6 is a view of an external appearance of the apparatus having the structure for mounting the backup battery in the case where the external appearance is viewed from the bottom of the apparatus in a state in which a bottom plate is partially removed from the apparatus.

The connection portion 93 provided in the circuit board 92 and the insertion hole 66 provided in the partition wall 61 are positioned on a straight line (shown as a line A in FIGS. 5 and 6). When the inside of the multifunction device 1 is viewed from the insertion hole 66, a user can see the connection portion 93. Connectors having no stopper mechanism or the like provided for preventing the connectors from being removed from each other are intentionally used as the connectors of the connection portion 93. In addition, the connection portion 93 is mounted on the circuit board 92 so that the direction of canceling the male-female fitting of the two connection terminals 72 and 94 (i.e., the disconnecting direction) coincides with the line A. Accordingly, the two connection terminals 72 and 94 can be disconnected from each other quickly when a certain amount of force in the disconnecting direction acts on the connection portion 93.

Figure 7:
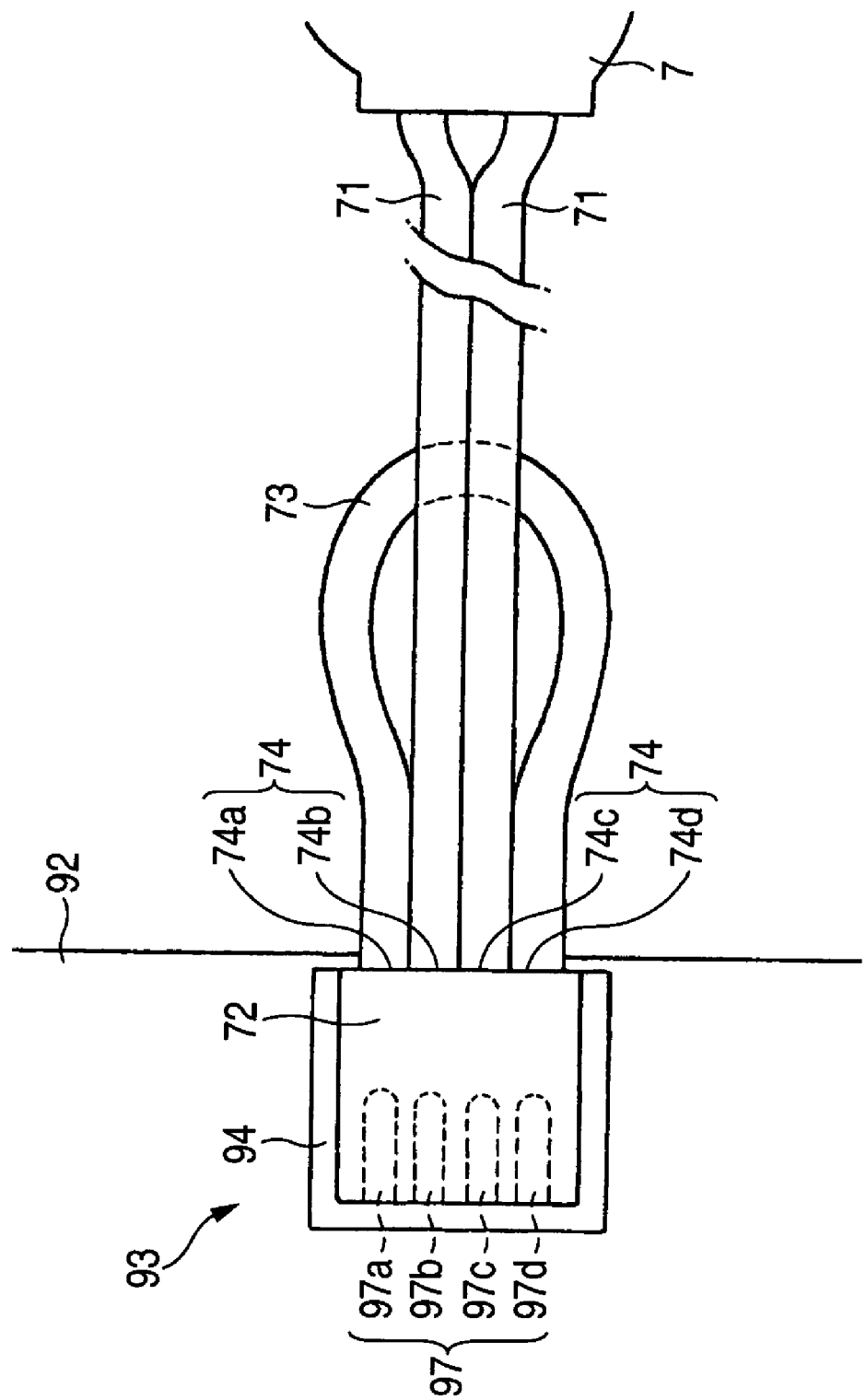
FIG. 7 is a plan view of a connection portion of the apparatus.

A two-pin connection terminal can be used naturally as the female connection terminal 72 attached to the lead wires 71 of the backup battery 7 because the number of the lead wires 71 is two. However, in this embodiment, a four-pin connection terminal is used as the female connection terminal 72 as shown in FIG. 7. The connection terminal 72 has four female connecting pins 74 (74a to 74d) which are provided as follows. The two lead wires 71 are connected to two inner female connecting pins 74b and 74c respectively while both ends of one looped lead wire 73 are connected to the other two outer female connecting pins 74a and 74d respectively so that the outer female connecting pins 74a and 74d can be electrically connected to each other. Incidentally, the male connection terminal 94 has four male connecting pins 97 (97a to 97d). Accordingly, if electrical connection between two outer male connecting pins 97a and 97d is checked when the two connection terminals 72 and 94 are fitted to each other, whether male-female fitting in the connection portion 93 is completed or not and whether the backup battery 7 is valid or not can be judged easily in a software sense without separation of the multifunctional device 1 into parts. That is, if the two outer male connecting pins 97a and 97d are electrically connected to each other, a decision can be made that the backup battery 7 is normally mounted in the multifunctional device 1. If the two outer male connecting pins 97a and 97d are not electrically connected to each other, a decision can be made that the backup battery 7 is not mounted in the multifunctional device 1 or that fitting of the two connection terminals 72 and 94 is incomplete. Accordingly, there is also an advantage that proportion detectives at the time of manufacturing can be checked easily even after assembling of the multifunctional device 1.

In the inside of the multifunctional device 1, a clear space 95 is provided between the connection portion 93 provided in the circuit board 92 and the insertion hole 66 as shown in FIGS. 5 and 6. In this embodiment, a circuit board 96 nearer to the insertion hole 66 than the circuit board 92 is mounted in a position higher (upper in FIG. 5) than the circuit board 92 to prevent protrusion of obstacles such as circuit parts and mechanical parts to thereby form the space 95.

According to this configuration, the backup battery 7 can be mounted as follows. First, the connection terminal 72 of the lead wires 71 of the backup battery 7 is inserted into the insertion hole 66 of the partition wall 66 and connected to the connection terminal 94 of the circuit board 92 mounted in the inside of the multifunctional device 1, by means of male-female fitting (see FIGS. 5 and 6). Then, electrical connection between the two outer male connecting pins 97a and 97d of the connection terminal 94 is checked as to whether male-female fitting is completed or not. Although the bottom plate 75 of the multifunctional device 1 is not shown in FIG. 6, the bottom plate 75 is attached to the multifunctional device 1 after completion of the aforementioned process. Alternatively, electrical connection between the male connecting pins 97a and 97d may be checked after assembling of the multifunctional device 1 is completed.

Then, the backup battery 7 is put in the recess 62. As described above, because the recess 62 has no means for fixing the backup battery 7, the process of putting the backup battery 7 into the recess 62 is completed easily by means of inserting the backup battery 7 into the recess 62. For this reason, the backup battery 7 may move slightly back and forth or right and left in the recess 62, There is however no fear that the backup battery 7 will drop out in the inside of the multifunctional device 1, because the recess 62 is opened outward as described above. In addition, the motion of the backup battery 7 is suppressed when the cover 68 is closed.

When the body of the multifunctional device 1 must be discarded, the user himself or herself can remove the backup battery 7 as follows. First, the cover 68 is opened. Then, the backup battery 7 is taken out of the recess 62. As described above, because the cover 68 is of a slide type in addition to the fact that the recess 62 has no means for fixing the backup battery 7, it is unnecessary to use any jig or the like. Then, when force is applied on the lead wires 71 to pull the lead wires 71 out of the insertion hole 66 while the backup battery 7 is gripped, the connection terminals 72 and 94 fitted to each other in the connection portion 93 are disconnected from each other. In this case, the connection terminals 72 and 94 can be disconnected from each other by only the pulling operation without necessity of removing the bottom plate 75 or any side plate of the multifunctional device 1. On this occasion, because the disconnecting direction in the connection portion 93 is made coincident with the line A connecting the connection portion 93 and the insertion hole 66 to each other, the force to pull the lead wires 71 out of the insertion hole 66 is transmitted to the connection portion 93 so efficiently that the fitting in the connection portion 93 can be canceled rapidly. In addition, because the clear space 95 is provided between the connection portion 93 and the insertion hole 66, the lead wires 71 can be pulled out of the insertion hole 66 while prevented from being hooked by various kinds of parts in the inside of the multifunctional device 1. In short, removal of the backup battery 7 can be completed by a very simple operation of opening the cover 68 and pulling the lead wires 71 out of the insertion hole 66 while gripping the backup battery 7. On this occasion, because the inside of the multifunctional device 1 is covered with the partition wall 61, there is no fear that the user will hurt himself or herself in taking his or her finger into the multifunction device 1 by mistake.

Figure 8:
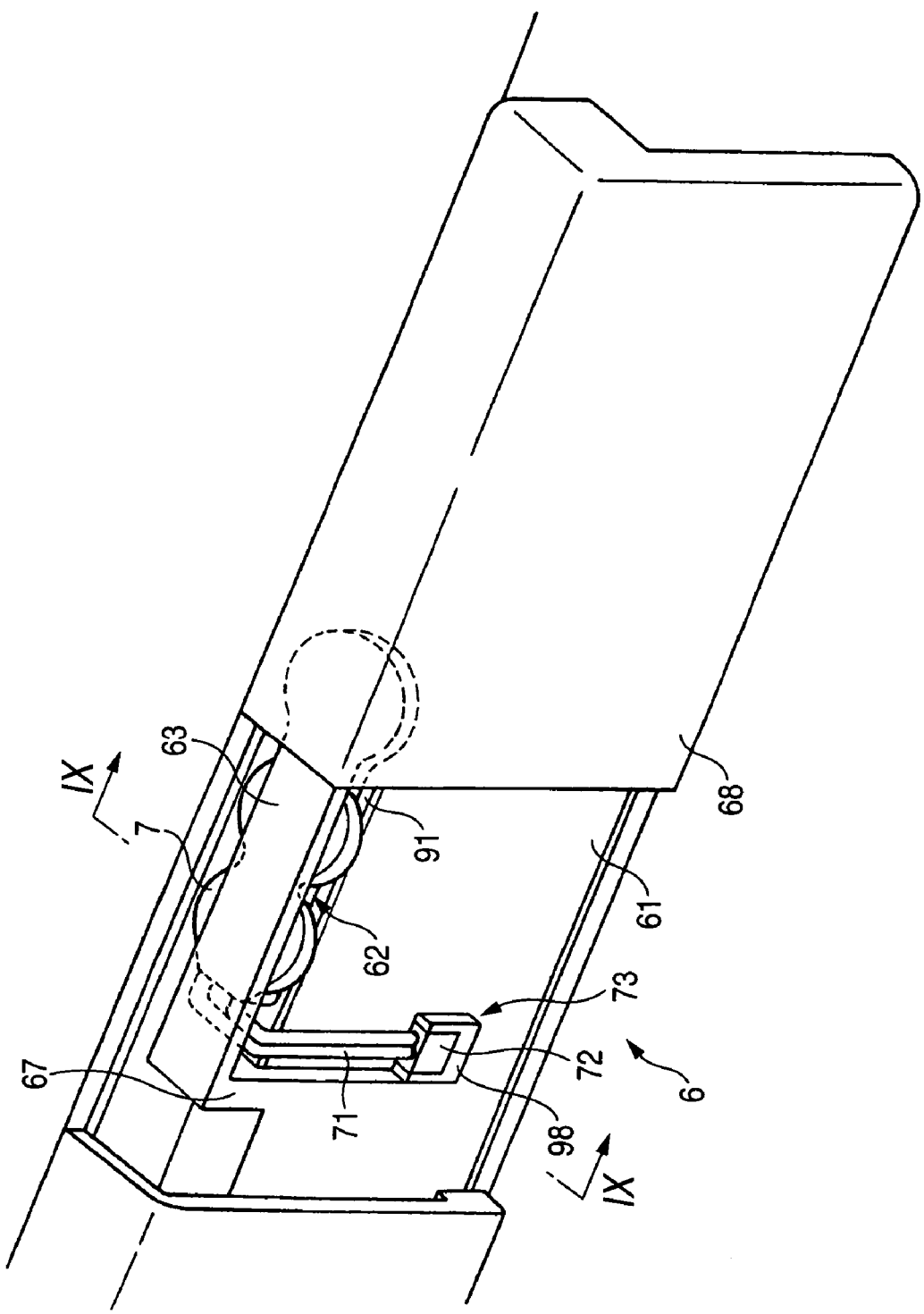
FIG. 8 is a perspective view of a structure for mounting a backup battery according to another embodiment of the invention.
Figure 9:
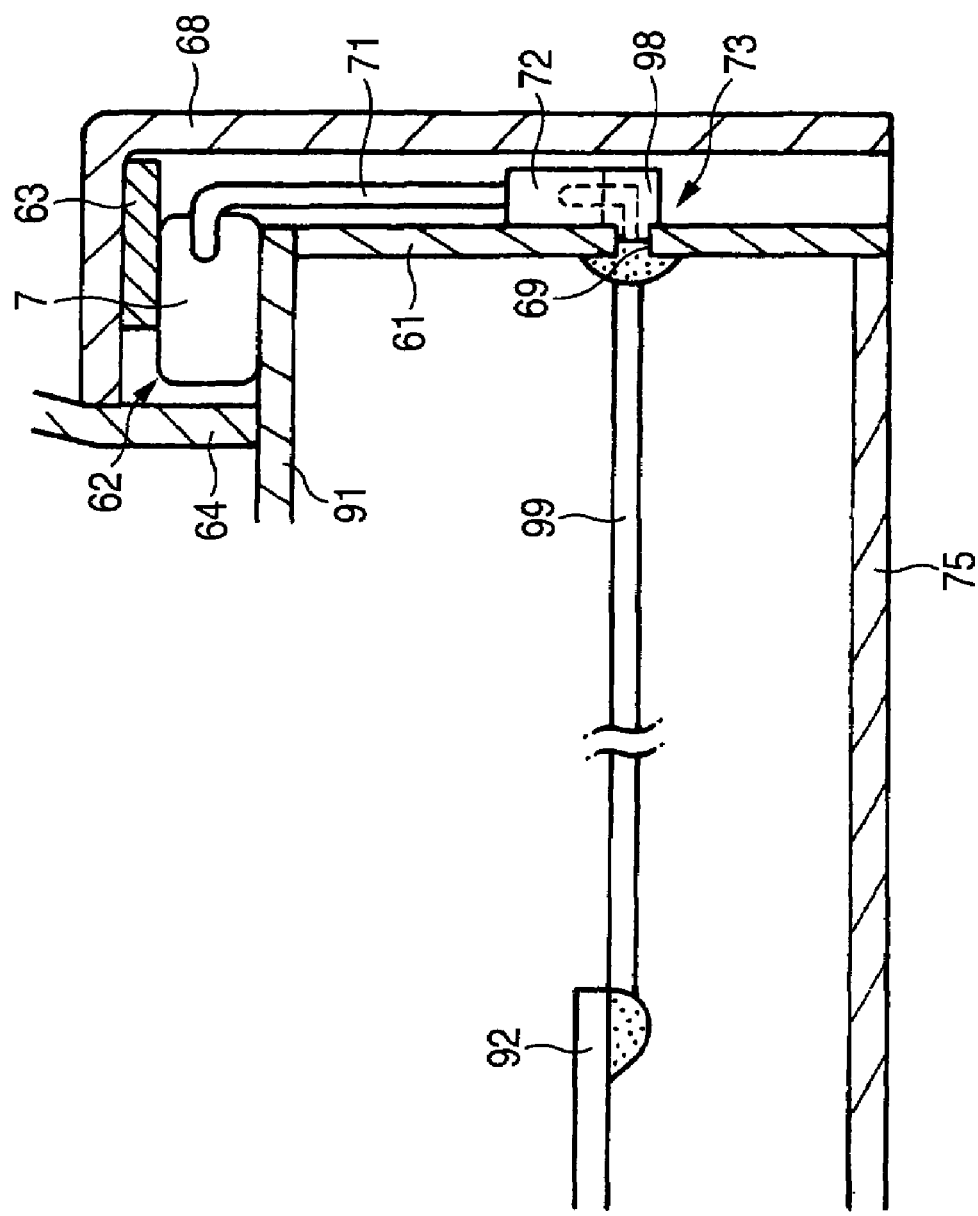
FIG. 9 is a partly sectional view taken along the line IX-IX in FIG. 8.

Although the embodiment has been described on the case where the backup battery 7 and the circuit board 92 supplied with electric power from the backup battery 7 are connected to each other in the connection portion provided in the inside of the multifunction device 1, the connect position is not limited thereto. For example, in another embodiment, the connection portion may be provided in the storage portion 6 as shown in FIGS. 8 and 9. In the embodiment shown in FIGS. 8 and 9, lead wires 99 drawn out of the circuit board 92 using electric power of the backup battery 7 are electrically connected to a male connection terminal 98 fixed to the outside of the partition wall 61 (on the rear side of the multifunctional device 1), through a small-diameter through-hole 69 provided in the partition wall 61. The female connection terminal 72 attached to the lead wires 71 of the backup battery 7 is connected to the connection terminal 98 to thereby form the connection portion 73. Accordingly, in this embodiment, the operation of pulling the lead wires 71 out of the insertion hole 66 in the aforementioned manner can be dispensed with, so that the backup battery 7 can be removed from the multifunction device 1 by a simple operation of performing pulling in the storage portion 6 to cancel the male-female fitting in the connection portion 73. Accordingly, it is unnecessary to provide the clear space 95 in the inside of the multifunctional device 1 or consider the position of the connection portion 93. That is, because the lead wires 99 which connects the circuit board 92 and the connection terminal 98 to each other can be laid freely in the inside of the multifunctional device 1, the degree of freedom in designing the inside of the multifunctional device 1 can be improved.

The invention can be applied not only to the multifunctional device 1 but also to any kind of apparatus such as a mobile terminal of a personal computer, a VCR, a facsimile machine or a copy machine so long as the apparatus uses a backup battery.

What is claimed is:

1. An apparatus having a structure for mounting a backup battery, comprising:
    an inner portion which is provided in a body of the apparatus;
    a storage portion which is provided in the body of the apparatus and includes a recess, which opens to an outside of the apparatus and stores the backup battery therein;
    a cover which is attached to the body of the apparatus to cover the backup battery put in the recess;
    a partition wall which separates the storage portion and the inner portion;
    a lead wire of the backup battery; and
    a circuit board which is built in the apparatus, the circuit board using electric power of the backup battery, the circuit board including a connection portion which connects the circuit board to the lead wire of the backup battery, wherein
    the partition wall has an insertion hole through which the lead wire passes, and
    the connection portion, the insertion hole and a part of the lead wire are arranged on a substantially straight line.

2. The apparatus according to claim 1, wherein the connection portion between the circuit board and the lead wire of the backup battery comprises a male-female fitting connection.

3. The apparatus according to claim 1, wherein
    a direction of disconnecting the connection between the circuit board and the lead wire of the backup battery in the connection portion from each other is substantially coincident with the straight line connecting the connection portion and the insertion hole to each other.

4. The apparatus according to claim 1, wherein a space including no obstacles is defined between the connection portion and the insertion hole.

5. The apparatus according to claim 3, wherein a space including no obstacles is defined between the connection portion and the insertion hole.

6. The apparatus according to claim 1, wherein the lead wire is connected to the connection portion such that the lead wire is capable of pulling out toward the insertion hole.

7. The apparatus according to claim 3, wherein the lead wire is connected to the connection portion such that the lead wire is capable of pulling out toward the insertion hole.

8. The apparatus according to claim 1, wherein the cover further covers the insertion hole.

9. The apparatus according to claim 3, wherein the cover further covers the insertion hole.

10. The apparatus according to claim 2, wherein:
    the male-female fitting connection comprises:
        four male connectors; and
        four female connectors,
    two of the four female connectors are connected to the lead wire of the backup battery, and
    the other of the four female connectors are connected to one end of a check lead wire and the other end of the check lead wire, respectively.

11. The apparatus according to claim 1,
    wherein the part of the lead wire is provided straightly between the connection portion and the insertion hole.

* * * * *